United States Patent
Feder et al.

(10) Patent No.: US 10,174,177 B2
(45) Date of Patent: Jan. 8, 2019

(54) METHOD FOR COATING A FLEXIBLE SUPPORT WITH A SILICONE COMPOSITION

(71) Applicant: Bluestar Silicones France SAS, Lyons (FR)

(72) Inventors: Michel Feder, Villeurbanne (FR); Christian Maliverney, Saint Julien sur Bibost (FR)

(73) Assignee: ELKEM SILICONES FRANCE SAS, Lyons (FR)

( * ) Notice: Subject to any disclaimer, the term of this patent is extended or adjusted under 35 U.S.C. 154(b) by 36 days.

(21) Appl. No.: 15/304,602

(22) PCT Filed: Apr. 14, 2015

(86) PCT No.: PCT/FR2015/000078
§ 371 (c)(1),
(2) Date: Oct. 17, 2016

(87) PCT Pub. No.: WO2015/158967
PCT Pub. Date: Oct. 22, 2015

(65) Prior Publication Data
US 2017/0044338 A1    Feb. 16, 2017

(30) Foreign Application Priority Data

Apr. 18, 2014 (FR) .................... 14 00941

(51) Int. Cl.
| | |
|---|---|
| C08J 7/04 | (2006.01) |
| C09D 183/04 | (2006.01) |
| D06N 3/12 | (2006.01) |
| B05D 1/36 | (2006.01) |
| B05D 3/04 | (2006.01) |
| B05D 3/10 | (2006.01) |
| C08G 77/04 | (2006.01) |
| C08J 3/24 | (2006.01) |
| C08K 5/098 | (2006.01) |
| C08G 77/16 | (2006.01) |

(52) U.S. Cl.
CPC ............... *C08J 7/047* (2013.01); *B05D 1/36* (2013.01); *B05D 3/0406* (2013.01); *B05D 3/046* (2013.01); *B05D 3/108* (2013.01); *C08G 77/04* (2013.01); *C08J 3/24* (2013.01); *C09D 183/04* (2013.01); *D06N 3/128* (2013.01); *B05D 2256/00* (2013.01); *B05D 2518/12* (2013.01); *C08G 77/16* (2013.01); *C08J 2375/06* (2013.01); *C08J 2377/00* (2013.01); *C08J 2483/04* (2013.01); *C08K 5/098* (2013.01); *D06N 2201/0209* (2013.01); *D06N 2201/0263* (2013.01)

(58) Field of Classification Search
None
See application file for complete search history.

(56) References Cited

U.S. PATENT DOCUMENTS

| | | | | |
|---|---|---|---|---|
| 4,536,529 A | * | 8/1985 | Frye .................... | C08K 5/0066 106/18.12 |
| 5,595,675 A | * | 1/1997 | Aso ....................... | C08K 5/098 106/287.13 |
| 5,985,997 A | | 11/1999 | Beljanski et al. | |
| 2007/0203307 A1 | | 8/2007 | Cavaleiro et al. | |
| 2009/0171044 A1 | * | 7/2009 | Spencer ................ | C08F 110/06 526/125.3 |
| 2010/0022717 A1 | * | 1/2010 | Honma .................. | C08G 18/10 525/452 |
| 2011/0028646 A1 | | 2/2011 | Sixt et al. | |

OTHER PUBLICATIONS

International Search Report dated Jul. 15, 2015 in counterpart French Application No. PCT/FR2015/000078.

* cited by examiner

*Primary Examiner* — Erma C Cameron
(74) *Attorney, Agent, or Firm* — McBee Moore Woodward & Vanik LLC

(57) ABSTRACT

The present invention concerns a method for coating a textile material with a silicone elastomer composition cross-linkable by condensation reactions, to produce a solid silicone elastomer, optionally in a thin layer, on a flexible support that can be made from a textile material, paper, polyvinyl chloride, polyester, polypropylene, polyamide, polyethylene, polyurethane, non-woven glass fiber fabric or polyethylene terephthalate.

20 Claims, No Drawings

METHOD FOR COATING A FLEXIBLE SUPPORT WITH A SILICONE COMPOSITION

CROSS REFERENCE TO RELATED APPLICATIONS

This application is a § 371 National Stage Application of PCT/FR2015/000078, filed 14 Apr. 2015, which claims priority to FR 14/00941, filed 18 Apr. 2014.

BACKGROUND

The present invention relates to a process for coating a flexible support which is preferably made of textile, paper, polyvinyl chloride, polyester, polypropylene, polyamide, polyethylene, polyurethane, nonwoven glass fiber fabrics or polyethylene terephthalate, with a liquid silicone composition that is crosslinkable via condensation reactions.

DESCRIPTION OF RELATED ART

The general field of the invention is that of the use of liquid silicone compositions that are crosslinkable via condensation reactions, for producing a solid silicone elastomer, optionally as a thin layer, on a flexible support which may be made of textile, paper, polyvinyl chloride, polyester, polypropylene, polyamide, polyethylene, polyurethane, nonwoven glass fiber fabrics or polyethylene terephthalate.

In the field of coating curable liquid silicone compositions on a flexible support to form solid silicone coats (or "silicone elastomers"), silicone compositions that crosslink by polyaddition or cationically are widespread. In order for curing of the coated compositions to take place, especially when thin layers are desired, it is necessary to provide a thermal energy supply by means of an oven whose operating temperatures may reach 210° C. or by irradiation using high-pressure lamps emitting electromagnetic or infrared radiation. These techniques make it possible to achieve rapid crosslinking times (less than one minute for certain applications) and also to use rapid coating speeds which, depending on the applications, may be of the order of several hundred meters per minute.

However, these coating techniques are very energy intensive and some of them use precious metals (for example platinum) which have an appreciable impact on the costs of the finished products. Furthermore, the temperature range required to crosslink this type of liquid composition so as to form a thin layer does not allow application on all types of flexible supports, especially those that are sensitive to any increase in temperature of the ambient medium. Examples of flexible supports that are fragile in the face of an increase in temperature are: flexible supports made of thermoplastic materials with glass transition temperatures of less than 100° C. or textile lace.

It is for these reasons that liquid silicone compositions which crosslink via condensation reactions conserve substantial appeal in this type of application since they offer the possibility of crosslinking (and thus curing) at room temperature when they are exposed to atmospheric humidity. Occasionally, the crosslinking may be accelerated by passing the coated flexible support through a heated oven allowing efficient control of the temperature and the hygrometry of the ambient atmosphere. The operating temperature of these ovens is generally less than 100° C., usually between 50 and 90° C., which is thus much less than those commonly used in liquid silicone compositions that are crosslinkable by polyaddition (temperatures of between 180 and 210° C.). Condensation-crosslinkable silicone compositions therefore require little or no energy input to form a solid silicone coat. Certain industrial coating lines are also equipped with a vapor jet device making it possible in a first chamber to accelerate the hydrolysis of the reactive functions, followed by passage through a hot (temperature which may be above 100° C. if the type of flexible support allows it) and dry oven, making it possible to finish the crosslinking of the silicone coat by condensation of the pre-hydrolyzed reactive functions. The silicone compositions crosslinking by hydrolysis and condensation may be prepared from constituents that are conditioned:

in one part (or in a single pack), which are known as "one-pack" or "RTV-1"; or in two parts, which are known as "two-pack" or "RTV-2".

Those that are conditioned in a single pack (RTV-1) have the advantage of being readily implemented since it is not necessary to use complex mixers to prepare the liquid silicone composition to be coated and which is thus directly ready for use. RTV-1 one-pack compositions are described in detail, for example, in patents EP 141 685, EP 147 323, EP 102 268, EP 21 859, FR 2 121 289 and FR 2 121 631.

The term "RTV" is the abbreviation for "Room-Temperature Vulcanizing" and is well known in the field of silicones.

The term "room temperature" means a temperature generally between 15 and 25° C.

Generally, the condensation reaction kinetics are extremely slow. These reactions are thus catalyzed with a suitable catalyst. As catalysts used, use is usually made of catalysts based on tin, titanium, an amine or compositions of these catalysts. Catalysts based on tin (cf. especially FR-A-2 557 582) and titanium (cf. especially FR-A-2 786 497) are catalysts with good efficiency. Usually, the condensation catalyst is based on an organotin compound. Specifically, many tin-based catalysts have already been proposed as catalyst for crosslinking these RTV-1 or RTV-2. Standard polycondensation catalysts comprise dialkyltin compounds, especially dialkyltin carboxylates such as dibutyltin dilaurate and diacetate, alkyl titanate compounds such as tetrabutyl or tetraisopropyl titanates, titanium chelates (EP-A-0 885 933, U.S. Pat. No. 5,519,104, U.S. Pat. No. 4,515,932, U.S. Pat. No. 4,563,498, U.S. Pat. No. 4,528,353).

The coating of silicone compositions that are crosslinkable via condensation reactions onto flexible supports targets numerous applications. For example, when the flexible support is a textile, water repellency properties are targeted, or when the textile is a textile elastic band or lace, skin-adhesion and slip-proof properties are desired. When the flexible support is a paper or a polymer of PVC, PET or polyamide type, non-stick properties are then usually desired.

Thus, once applied to a flexible support, the silicone formulation crosslinks on contact with atmospheric humidity, or by addition of water or of a water precursor, to form a solid silicone material, which, depending on the applications, will target non-stick and/or water-repellency properties. In certain applications and depending on the type of flexible support, the resulting product is either a composite material if the coating operation results in the formation of a layer of a crosslinked silicone elastomer on a flexible support, or a flexible support continuously or discontinuously coated with a bead formed from a solid silicone elastomer, and thus crosslinked.

But, an industrial production involves coating rates that are as high as possible so as to optimize the productivity and storage of the finished or semi-finished products for subsequent use or treatment. Storage is commonly formed, according to the type of industry, by stacking the coated flexible supports or by rolling up the coated flexible supports using rollers or rolling cylinders. However, one of the challenges encountered by these practices lies in the chemical mechanism of curing. Specifically, the first step of the condensation consists of a hydrolysis of reactive functions of acetoxysilane, ketiminoxysilane or alkoxysilane type to form silanol groups by means of the water vapor of the ambient air which diffuses into the material from the surface exposed to the atmosphere. This hydrolysis step is thus key since it is followed by condensation reactions between the silanol groups formed and other residual reactive functions. However, the diffusion of water vapor into the silicone material from the surface exposed to the atmosphere is not instantaneous and entails that the mass to be crosslinked can continue to cure even during storage and especially when the coating rates are rapid. Thus, the flexible supports coated with cured silicones may continue to evolve over time as regards the crosslinking, which is reflected by undesirable adhesion between two coated flexible supports placed in contact or between two zones of the same flexible support placed in contact. This phenomenon is known as "blocking" and entails the need to exert a larger force to unroll or isolate the finished or semi-finished product when it is taken from storage. This phenomenon is the cause of many defects due to deterioration of the cured silicone material by tearing-off of the silicone material or by the appearance of fractures in the bulk of the cured silicone elastomer.

The prior art in the field of silicones dealing with "blocking" problems associated with the coating of silicone compositions that are crosslinkable via condensation reactions onto flexible supports is very sparse or even non-existent.

Another challenge to be addressed for the use of condensation-crosslinkable liquid silicone compositions is associated with the need for certain applications to form on flexible supports thin layers of silicone elastomer that are as transparent as possible.

The prior art dealing with transparency properties for solid silicone elastomers obtained by condensation is patent application US-2011/0 028 646-A1. Said reference describes condensation catalysts with transparency properties (non-yellowing) chosen from the group formed by metal salts of the following metals: Li, Na, K, Mg, Ca and Sr. The carboxylates corresponding to these metals are preferred and especially Li and Sr carboxylates, especially lithium octoate [Li(oct)] and strontium octoate [Sr(oct)$_2$] which are in support of the examples and which involve C$_8$ carboxylate ligands. However, although said publication does not deal with the problem of "blocking" during the coating of this type of composition onto flexible supports, it was checked by the inventors of the present application that the types of catalyst illustrated do not make it possible to obtain solid silicone coatings free of "blocking" on storage when they are used for coating onto flexible supports.

Titanium-based catalysts, which are also very widely used in RTV-1 compositions, also have other major drawbacks since they have slower kinetics than tin-based catalysts, with yellowing problems and are more difficult to use in RTV-2 compositions due to gelation problems. Other catalysts are occasionally mentioned, such as catalysts based on zinc, zirconium or aluminum, but they have been met with little industrial development due to their poor efficiency.

It is for the reasons mentioned above that alkyltin-based catalysts are still very widely used since they are very efficient, usually colorless, liquid and soluble in silicone oils. However, it is now acknowledged that they have the drawback of being toxic (CMR2 toxic for reproduction). For sustainable development, it thus appears necessary to develop non-toxic catalysts for coating a flexible support with liquid silicone compositions that are curable via condensation reactions to form solid silicone coatings (or "silicone elastomers").

SUMMARY

In this context, one of the essential objectives of the present invention is to develop a process for coating a liquid silicone composition that is crosslinkable via condensation reactions to form a solid silicone elastomer via condensation reactions on a flexible support making it possible to obtain flexible supports coated with solid silicone elastomers that do not have the problem of "blocking" on storage.

Another objective of the present invention is to obtain flexible supports coated with a solid silicone elastomer that are translucent or transparent.

Another essential objective of the present invention is to provide a process using a silicone composition not containing any toxic chemical compounds, and in particular not containing any tin-based catalysts.

Another essential objective of this invention is to provide a flexible support coated on one or two faces continuously or discontinuously with a solid silicone elastomer, which no longer has the problem of "blocking" on storage.

Another essential objective of the present invention is to provide a condensation-crosslinkable liquid silicone composition not containing any tin-based catalysts, which, when coated onto a flexible support, makes it possible to obtain a coated flexible support not having the problem of "blocking" on storage.

All these objectives, among others, are achieved by the present invention, which relates to a process for coating a liquid silicone composition (X) that is crosslinkable via condensation reactions to form a solid silicone elastomer on a flexible support (S), comprising steps a), b) and c) below:

a) a liquid silicone composition (X) that is crosslinkable via condensation reactions is prepared, comprising:
  at least one organosilicon compound (A) comprising at least two identical or different hydrolyzable and condensable groups, or at least two silanol functions ≡SiOH,
  at least one crosslinking agent (B),
  optionally at least one filler (C), and
  a catalytically effective amount of at least one catalyst (M) which is a magnesium complex comprising in its structure two identical or different carboxylate ligands, comprising from 10 to 32 carbon atoms, and preferably from 10 to 20 carbon atoms, b) on a flexible support (S), which may optionally be pre-covered on one or two faces with one or more layers of a polymer material, said silicone composition (X) is deposited continuously or discontinuously onto one face of said flexible support (S) or optionally onto the two faces of said flexible support (S), and c) said silicone composition (X) is left to crosslink in the presence of humidity provided by the ambient air or by exposure to water vapor, or by prior addition of water to said silicone composition (X) so as to form a crosslinked solid silicone elastomer.

DETAILED DESCRIPTION OF A PREFERRED EMBODIMENT

To achieve this objective, the Applicant demonstrated, to its credit, entirely surprisingly and unexpectedly, that the choice of a family of specific compounds that are magnesium carboxylates comprising from 10 to 32 carbon atoms makes it possible to overcome the problems of "blocking" on storage when they are used as condensation catalyst for silicone compositions coated onto flexible supports.

This is particularly surprising given that complexes having very similar chemical structure such as:
- a $C_8$ magnesium carboxylate (magnesium bis-2-ethylhexanoate, catalyst (C-1) in the comparative examples of the present application),
- a $C_8$ strontium carboxylate (strontium (bis(2-ethylhexanoate)), catalyst (C-4) in the comparative examples of the present application),
- a $C_{10}$ calcium carboxylate (calcium bis-neodecanoate, catalyst (C-2) in the comparative examples of the present application), or
- a $C_{10}$ lithium carboxylate (lithium neodecanoate, catalyst (C-3) in the comparative examples of the present application);

do not make it possible to solve these problems of "blocking" on storage of coated flexible supports. Thus, the use of a $C_{10}$ calcium carboxylate as condensation catalyst does not make it possible to solve the "blocking" problem described above, wherein calcium is a chemical element belonging to the same column (IIA) of the Periodic Table as that of the chemical element magnesium (Mg).

The use of the catalyst (M) according to the invention also makes it possible to obtain transparent or translucent solid silicone elastomers, which has certain advantages when they are used for forming solid coats on transparent or translucent supports. That is to say that the use of the catalyst (M) according to the invention does not lead to any residual colorings such as those observed, for example, with titanium-based catalysts (yellow coloring).

The term "transparent" means that the material allows light to pass through totally, without scattering or absorbing it (or only very little), i.e. it is possible to see very clearly through the material.

The term "translucent" means that the material allows light to pass through partially, without it being possible, however, to see clearly through the material.

It is understood that the term "complex" includes in its definition any monomeric, oligomeric or similar form of said magnesium complex according to the invention.

The catalysts according to the invention are either commercially available or prepared by reacting, for example, one or more magnesium alkoxides, for example magnesium methoxide $Mg(OCH_3)_2$ or magnesium ethoxide $Mg(OC_2H_5)_2$, with a desired $C_{10}$ to $C_{32}$ carboxylic acid, optionally in the presence of a solvent, such as an aromatic solvent, for instance toluene or xylene. It is also possible to use magnesium oxide or hydroxide as precursor.

Optionally, the catalyst(s) according to the invention may be used in the presence of other condensation catalysts such as zinc carboxylates or a titanium alkoxide or chelate.

According to a preferred embodiment of the process according to the invention, in step b), a sufficient amount of said silicone composition (X) is deposited so as to form either a bead or a continuous layer on said flexible support (S).

According to another preferred embodiment of the process according to the invention, in step c), said silicone composition (X) is left to crosslink in the presence of humidity provided by the ambient air or by exposure to water vapor, or by prior addition of water to said silicone composition (X) at a temperature of between 20 and 90° C., preferably between 40 and 90° C., and even more preferentially between 50 and 90° C. For this, it is particularly advantageous to use a climatic chamber which will have the advantage of maintaining both a constant temperature of the ambient medium and of controlling the humidity content.

The term "humidity" means the presence of water or of water vapor in the air.

According to another embodiment of the invention, when the humidity is provided by exposure to water vapor, for example by a vapor jet device, a step d) may be performed after step c) and consists in passing the coated flexible support from step c) into a hot oven whose air is dry (with a temperature that may be greater than 100° C. if the nature of the support allows it or between 50 and 100° C.). This additional step thus makes it possible to complete the crosslinking of the silicone coat by condensation of the pre-hydrolyzed reactive functions.

The term "dry air" means that the relative humidity in the oven is lower close to 0% or less than 0.1%.

According to the process according to the invention, it is advantageous to use a climatic chamber which maintains a temperature of between 70 and 90° C. and with a degree of relative humidity (RH) maintained between 5% and 45%, preferably between 15% and 25% and even more preferentially at 20% relative humidity.

The term "sufficient amount" means the amount expressed in grams per unit area of the flexible support (S) to be coated (usually expressed in g/m²) so as to form either a layer or a coat, or a bead depending on the targeted applications. A person skilled in the art knows how to adjust this amount depending on the desired thickness of the coat and depending on the type of flexible support.

For example, when the flexible support (S) is made of paper, the composition (X) may be coated to a proportion of 0.5 to 5 g/m², and preferably from 0.6 to 2 g/m², the amount varying depending on the desired thickness of the coat. As a guide, a coating of 1 g/m² onto this type of support will form, after the coating operation, a coat of about 1 μm.

When the flexible support (S) is made of polyamide, composition (X) may be coated to a proportion of 10 to 40 g/m², the amount varying depending on the desired thickness of the coat.

When the flexible support is a lace and when it is desired to coat it so as to form a crosslinked solid silicone bead, the rate of deposition of composition (X) is adapted so that the thickness of the layer of composition (X) deposited on this lace is between 0.20 and 0.50 mm.

The amount of catalyst (M) according to the invention is generally between 0.05% and 10% by weight relative to the total weight of the composition, preferably between 0.10% and 5% and even more preferentially between 0.15% and 1% by weight relative to the total weight of the composition.

According to a preferred variant, the catalyst (M) may be added to composition (X) in a form diluted in an organic solvent, for instance: toluene, xylene, methyl isobutyl ketone or neodecanoic acid.

According to a preferred embodiment, the catalyst (M) is a complex of formula (1) below:

in which:
the symbols $C^1$ and $C^2$ are identical or different ligands chosen from the group of carboxylates comprising from 10 to 32 carbon atoms, preferably from 10 to 20 carbon atoms and even more preferentially from 10 to 15 carbon atoms, the symbols x and y represent the number of carboxylate ligands and are integers equal to 0, 1 or 2 with the condition that the sum x+y=2.

According to another preferred embodiment, the catalyst (M) is a complex of formula (2) below:

$$[Mg(C^1)_2] \quad (2)$$

in which:

the symbol $C^1$ is a ligand chosen from the group of carboxylates comprising from 10 to 32 carbon atoms, preferably from 10 to 20 carbon atoms and even more preferentially from 10 to 15 carbon atoms.

According to another preferred embodiment, the carboxylate ligands are chosen from the group formed by:

the anions: decanoate [CH$_3$—(CH$_2$)$_8$—COO]$^-$, undecanoate [CH$_3$—(CH$_2$)$_9$—COO]$^-$, dodecanoate or laurate [CH$_3$—(CH$_2$)$_{10}$—COO]$^-$, tridecanoate [CH$_3$—(CH$_2$)$_{11}$—COO]$^-$, tetradecanoate or myristate [CH$_3$—(CH$_2$)$_{12}$—COO]$^-$, pentadecanoate [CH$_3$—(CH$_2$)$_{13}$—COO]$^-$, hexadecanoate or palmitate [CH$_3$—(CH$_2$)$_{14}$—COO]$^-$, heptadecanoate [CH$_3$—(CH$_2$)$_{15}$—COO]$^-$, octadecanoate or stearate [CH$_3$—(CH$_2$)$_{16}$—COO]$^-$, nonadecanoate [CH$_3$—(CH$_2$)$_{17}$—COO]$^-$, eicosanoate [CH$_3$—(CH$_2$)$_{18}$—COO]$^-$, heneicosanoate [CH$_3$—(CH$_2$)$_{19}$—COO]$^-$, docosanoate or behenate [CH$_3$—(CH$_2$)$_{20}$—COO]$^-$, tricosanoate [CH$_3$—(CH$_2$)$_{21}$—COO]$^-$, tetracosanoate or lignocerate [CH$_3$—(CH$_2$)$_{22}$—COO]$^-$, pentacosanoate [CH$_3$—(CH$_2$)$_{23}$—COO]$^-$, hexacosanoate [CH$_3$—(CH$_2$)$_{24}$—COO]$^-$, heptacosanoate acid [CH$_3$—(CH$_2$)$_{25}$—COO]$^-$, octacosanoate [CH$_3$—(CH$_2$)$_{26}$—COO]$^-$, nonacosanoate [CH$_3$—(CH$_2$)$_{27}$—COO]$^-$, triacontanoate [CH$_3$—(CH$_2$)$_{28}$—COO]$^-$, hentriacontanoate [CH$_3$—(CH$_2$)$_{29}$—COO]$^-$, dotriacontanoate [CH$_3$—(CH$_2$)$_{30}$—COO]$^-$, palmitoleate [CH$_3$—(CH$_2$)$_5$—CH=CH—(CH$_2$)$_7$—COO]$^-$, oleate [CH$_3$(CH$_2$)$_7$CH=CH(CH$_2$)$_7$COO]$^-$, linoleate [CH$_3$—(CH$_2$)$_4$—(CH=CHCH$_2$)$_2$—(CH$_2$)$_6$—COO]$^-$, linolenate [CH$_3$—CH$_2$—(CH=CHCH$_2$)$_3$—(CH$_2$)$_6$—COO]$^-$ and arachidonate [CH$_3$—(CH$_2$)$_4$—(CH=CHCH$_2$)$_4$—(CH$_2$)$_2$—COO]$^-$, the anions: 7,7-dimethyloctanoate [(CH$_3$)$_3$C—(CH$_2$)$_5$—COO]$^-$, 2,2-dimethyloctanoate [CH$_3$—(CH$_2$)$_5$—C(CH$_3$)$_2$—COO]$^-$, 2,2,3,5-tetramethylhexanoate [(CH$_3$)$_2$CH—CH$_2$—CH(CH$_3$)—C(CH$_3$)$_2$—COO]$^-$, 2,5-dimethyl-2-ethylhexanoate [(CH$_3$)$_2$CH—(CH$_2$)$_2$—C(CH$_3$)(C$_2$H$_5$)—COO]$^-$, 2,2-diethylhexanoate [CH$_3$—(CH$_2$)$_3$—C(C$_2$H$_5$)$_2$—COO]$^-$, 2,4-dimethyl-2-isopropylpentanoate [(CH$_3$)$_2$CH—CH$_2$—C(CH$_3$) (i-propyl)-COO]$^-$, and $C_{10}$ to $C_{20}$ and preferably $C_{10}$ to $C_{15}$ naphthenate anions.

According to a particularly advantageous embodiment, the carboxylate ligands are chosen from the group formed by the carboxylates of empirical formula [C$_{10}$H$_{19}$O$_2$]$^-$ and $C_{10}$ to $C_{20}$ and preferably $C_{10}$ to $C_{15}$ naphthenates.

It is particularly advantageous to use as catalyst (M) the complex [Mg(neodecanoate)$_2$] or the complex [Mg(naphthenate)$_2$] with the naphthenate anion having a $C_{10}$ to $C_{20}$ and preferably $C_{10}$ to $C_{15}$ chemical structure.

The $C_{10}$ to $C_{20}$ naphthenate ligands are corresponding anions of the naphthenic acids. The naphthenic acids are by-products of the extraction of bituminous sands and are found mainly in bituminous sand residues. The commercial mixtures of naphthenic acids are used as solvents, detergents and rubber recovery agents. It may be a mixture of monocyclic and/or bicyclic carboxylic acids. Those concerned by the invention are formed from to 32 carbon atoms. A naphthenate ligand that is particularly useful according to the invention is the anion obtained from a technical mixture of carboxylic acids having structures of alkylcyclopentane type and formed on average from 14 to 15 carbon atoms, for instance cyclopentyl-(CH$_2$)$_{8-9}$—COOH carboxylic acids.

According to a preferred embodiment, the liquid silicone composition (X) that is crosslinkable via condensation reactions does not contain any catalyst having in its structure at least one tin atom.

According to a preferred embodiment, the flexible support (S) is made of textile, paper, polyvinyl chloride, polyester, polypropylene, polyamide, polyethylene, polyurethane, nonwoven glass fiber fabrics or polyethylene terephthalate.

For the purposes of the invention, the term "textile" means a generic term encompassing all textile structures. The textiles may be formed from yarns, fibers, filaments and/or other materials. They especially comprise flexible fabrics, whether they are woven, bonded, knitted, braided, made of felt, needled, sewn, or made via another manufacturing method.

These textiles may be openwork, i.e. they may comprise empty spaces not constituted by textile. In order for the coating of the silicone composition of the invention to be efficient, it is preferable for the smallest of the dimensions of these free spaces to be less than 5 mm, especially less than 1 mm. According to the invention, any type of flexible textile support (S) may be used. As a guide, mention may be made of:

natural textiles, such as: textiles of plant origin, such as cotton, linseed, hemp, jute, coconut, paper cellulose fibers; and textiles of animal origin, such as wool, hairs, leather and silks;

artificial textiles, such as: cellulose-based textiles, such as cellulose or derivatives thereof; and protein-based textiles of animal or plant origin; and synthetic textiles, such as polyester, polyamide, polymalic alcohols, polyvinyl chloride, polyacrylonitrile, polyolefins, acrylonitrile, (meth)acrylate-butadiene-styrene copolymers and polyurethane.

The synthetic textiles obtained by polymerization or polycondensation may especially comprise in their matrix various types of additives, such as pigments, delustring agents, matt-effect agents, catalysts, heat and/or light stabilizers, antistatic agents, flame retardants, antibacterial agents, antifungal agents and/or antiacarid agents.

As types of textile surfaces, mention may be made especially of surfaces obtained by rectilinear intercrossing of yarns or fabrics, surfaces obtained by curvilinear interlacing of yarns or knits, mixtilinear surfaces or tulles, nonwoven surfaces and composite surfaces. Among the multitude of possible textile surfaces that may be used in the process according to the invention, mention may be made of: felts, denims, Jacquard fabrics, needled fabrics, sewn fabrics, crocheted fabrics, grenadines, laces and lace fabrics, damasks, voiles, alpacas, baratheas, dimities, looped fabrics, brocades, calicos, velvets, canvases, chiffons, flocked fabrics, sized fabrics, cheese-cloths, braided fabrics, failles, foulards, gauzes, geofabrics, jaspés, matelassés, tufted fabrics, organzas, pleated fabrics, rapiers and toiles.

The flexible textile support (S) used in the process of the present invention may be constituted by one or more identical or different textiles, assembled in various ways. The textile may be monolayer or multilayer. The textile support may be constituted, for example, by a multilayer structure that may be made by various assembly means, such as mechanical means, for instance stitching, welding, or spot- or continuous bonding.

The flexible textile support (S) may, besides the coating process according to the present invention, undergo one or more other subsequent treatments, also known as finishing or dry filling treatment. These other treatments may be formed before, after and/or during said coating process of the invention. As other subsequent treatments, mention may be made especially of: dyeing, printing, laminating, coating, assembly with other materials or textile surfaces, washing, degreasing, preforming or fixing.

According to a preferred embodiment provision of the invention, the flexible support (S) is a textile and preferably a lace or an elastic band.

Preferably, in step b) of the process according to the invention, said liquid silicone composition (X) that is crosslinkable via condensation reactions is deposited on a flexible support (S) which is a textile by transfer, by dip roll or by spraying using a nozzle, a doctor blade, a rotating frame or a reverse roll.

An example of the use of dip rolls, which are particularly advantageous according to the invention, is described in patent application EP-1 979 521-A1. This technique is particularly suited to the impregnation of one of the faces of a complex textile surface with a fluid product, which is especially reactive or which has sensitivity to the surrounding atmosphere. This technique is based on the use of a perforated dip roll that is fixed, i.e. which does not roll, dispensing by means of an array of orifices arranged on one or more generatrices of the cylinder the appropriate amount of impregnation liquid directly onto one of the faces of the textile surface.

Thus, the following may be envisaged:
continuous coating by direct deposition onto textile or other supports. These depositions are of straight or sinusoidal strip, grate or point type; or
continuous coating by transfer deposition, which makes it possible to obtain extremely thin silicone layers with various surfaces states, which also allows the application of silicone onto delicate supports that are consequently difficult to use with a direct coating process.

According to a particular embodiment, when the process according to the invention is used in the printing of fabrics by screen printing, composition (X) according to the invention may be diluted in a silicone solvent (for example a solvent derived from petroleum fractions), and coated by screen printing onto a fabric (flexible support (S)). The amounts are generally chosen so as to form a quite thin layer (<1 mm). Next, step c) of the process according to the invention is performed (the ambient temperature and the degree of relative humidity varying according to the seasons and the geographical zones in which the coating takes place).

Another subject of the invention relates to a flexible support (S) coated on one or two faces continuously or discontinuously with a solid silicone elastomer that may be obtained via the process according to the invention and as described above.

Another subject of the invention relates to a composite material comprising:
a flexible support (S) which may be optionally covered on one or two faces with one or more layer(s) of a polymer material, and
a coat on said flexible support or on said polymer material formed from a solid silicone elastomer obtained according to the process of the invention as defined above.

The textiles thus obtained, in unmodified form or transformed into textile articles, may be used in numerous applications, for instance in the clothing field, especially women's underwear such as panty waistline or bra lace, and hygiene articles, such as compression bandages or dressings.

According to a particular embodiment, the organosilicon compound A is a polyorganosiloxane comprising:
(i) at least two siloxyl units of formula (3) below:

 (3)

in which:
the symbols $R^1$, which may be identical or different, represent $C_1$ to $C_{30}$ monovalent hydrocarbon-based radicals,
the symbols Z, which may be identical or different, each represent a hydrolyzable and condensable group or a hydroxyl group and are preferably chosen from the group formed by groups such as: hydroxyl, alkoxy, alkoxy-alkylene-oxy, amino, amido, acylamino, aminoxy, iminoxy, ketimonoxy, acyloxy, iminoxi, ketiminoxy and enoxy,
a is equal to 0, 1 or 2, b is equal to 1, 2 or 3, the sum a+b is equal to 1, 2 or 3, and optionally
(ii) one or more siloxyl units of formula (4) below:

 (4)

in which:
the symbols R, which may be identical or different, represent $C_1$ to $C_{30}$ monovalent hydrocarbon-based radicals optionally substituted with one or more halogen atoms or with groups from among: amino, ether, ester, epoxy, mercapto or cyano, and
the symbol c is equal to 0, 1, 2 or 3.

The dynamic viscosity at 25° C. of the organosilicon compound A may vary according to the type of flexible support S between 10 and $1 \times 10^6$ mPa·s and preferably between 10 and 300 000 mPa·s.

All the viscosities under consideration in the present specification correspond to a dynamic viscosity magnitude that is measured, in a manner known per se, at 25° C., with a machine of Brookfield type. As regards fluid products, the viscosity under consideration in the present specification is the dynamic viscosity at 25° C., known as the "Newtonian" viscosity, i.e. the dynamic viscosity that is measured, in a manner known per se, at a sufficiently low shear rate gradient so that the viscosity measured is independent of the rate gradient.

Examples of organosilicon compounds A used according to the invention are:
an α,ω-hydroxylated polydiorganosiloxane of formula (A'):

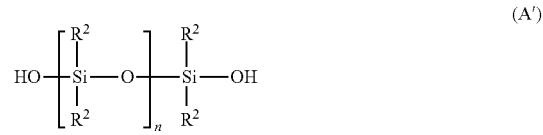 (A')

in which:
the substituents $R^2$, which may be identical or different, each represent an aliphatic, cyclanic or aromatic, substituted or unsubstituted, $C_1$ to $C_n$ saturated or unsaturated hydrocarbon-based monovalent radical and preferably the symbols $R^2$ are methyl groups; and with 1 n 4200 and preferably 2 n 1500; or a crosslinkable linear polyorganosiloxane of formula (5) below:

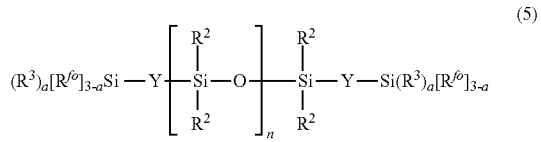

(5)

in which:

the substituents $R^2$, which may be identical or different, each represent an aliphatic, cyclanic or aromatic, substituted or unsubstituted, $C_1$ to $C_n$ saturated or unsaturated hydrocarbon-based monovalent radical; and preferably the symbols $R^2$ are methyl groups;

the substituents $R^3$, which may be identical or different, each represent an aliphatic, cyclanic or aromatic, substituted or unsubstituted $C_1$ to $C_n$ saturated or unsaturated hydrocarbon-based monovalent radical; and preferably the symbols Rn are methyl groups;

the functionalization substituents $R^{fo}$, which may be identical or different, each represent:

an iminoxy residue of formula: $(R_4)_2C=N-O-$ with $R^4$ independently representing a linear or branched $C_1$ to $C_8$ alkyl, a $C_3$ to $C_8$ cycloalkyl, a $C_2$ to $C_8$ alkenyl;

an alkoxy residue of formula: $R^5O(CH_2CH_2O)_b-$ with $R^5$ independently representing a linear or branched $C_1$ to $C_8$ alkyl, a $C_3$ to $C_8$ cycloalkyl and b=0 or 1;

an acyloxy residue of formula:

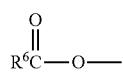

with $R^6$ representing an aliphatic, cyclanic or aromatic, substituted or unsubstituted $C_1$ to $C_{13}$ saturated or unsaturated hydrocarbon-based monovalent radical;

an enoxy residue of formula:

$(H)_{b'}(R^6)_{2-b'}C=C(-O-)R^6$ in which $R^6$ is as defined above and b'=0, 1 or 2;

each symbol Y represents an oxygen atom or a divalent hydrocarbon-based group; and n has a sufficient value to give the organosilicon compound A a dynamic viscosity at 25° C. ranging from 10 to $1\times10^6$ mPa·s and preferably between 10 and 300 000 mPa·s, and even more preferentially 1≤n≤4200 and preferably 2≤n≤1500 n.

According to a preferred embodiment, in a one-pack system, composition (X) according to the invention corresponds to an embodiment in which one of the essential constituents, namely the organosilicon compound A, is functionalized at its ends via the following methods:

when Y represents an oxygen atom: performing a condensation reaction between the end Si—OH units of an α,ω-hydroxylated polyorganosiloxane precursor A', described above, and a function $R^{fo}$ of a silane bearing the functions $R^{fo}$ described above; and when Y represents a divalent hydrocarbon-based group: performing an addition reaction between the end ≡Si—H units of a precursor α,ω-hydrogeno polyorganosiloxane A" and an olefinic silane bearing the functions $R^{fo}$; or alternatively addition reaction between the unsaturated ends (for example vinyl or allylic) of a polyorganosiloxane A''' and a hydrogenosilane bearing the functions $R^{fo}$.

The organosilicon compound A is functionalized according to techniques known to those skilled in the art. The functionalized organosilicon compound A corresponds to an embodiment in which composition (X) is stable, in the absence of humidity. In practice, this stable form is that of a composition conditioned in cartridges or hermetically sealed containers, which will be opened by the operator during use and which will allow him to feed the machine for coating the flexible supports targeted by the process according to the invention.

The hydrogeno precursor A" of the organosilicon compound A functionalized with groups $R^{fo}$ at the chain ends is an α,ω-hydrogeno polydiorganosiloxane of formula:

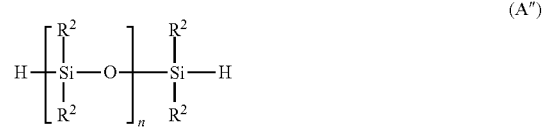

(A")

in which:

the substituents $R^2$, which may be identical or different, each represent an aliphatic, cyclanic or aromatic, substituted or unsubstituted, C1 to C13 saturated or unsaturated hydrocarbon-based monovalent radical; and preferably the symbols R2 are methyl groups; and n has a sufficient value to give the organosilicon compound A a dynamic viscosity at 25° C. ranging from 5 to 5000 mPa·s and preferably between 5 and 2000 mPa·s, and even more preferentially the value of n will range between 5 and 1000 and preferably between 5 and 500.

The precursor A''' of the organosilicon compound A functionalized with groups $R^{fo}$ at the chain ends is a polydiorganosiloxane corresponding to the definition given above for A" with the exception that the end hydrogen atoms are replaced with unsaturated groups (such as vinyl or allyl groups) and that n has a sufficient value to give the organosilicon compound A a dynamic viscosity at 25° C. ranging from 5 to $1\times10^6$ mPa·s, and preferably between 5 and 150 000 mPa·s, and even more preferentially the value of n will range between 5 and 5000 and preferably between 5 and 1500.

Composition (X) when it is formulated as a one-pack (RTV-1) composition, may be of the acid type (in this case, the functionalization $R^{fo}$ represents an acyloxy group) or alternatively of the neutral type (in this case, the functionalization $R^{fo}$ represents an alkoxy or iminoxy or enoxy group).

According to a particular embodiment, the crosslinking agent B is preferably a silicon compound in which each molecule comprises at least three hydrolyzable and condensable groups Y and said crosslinking agent B having formula (5) below:

$R'_{(4-a)}SiY_a$ (5)

in which:
i. the symbol R' is a monovalent hydrocarbon-based radical comprising from 1 to 30 carbon atoms,
ii. the symbol Y is an alkoxy, alkoxy-alkylene-oxy, amino, amido, acylamino, aminoxy, iminoxy, ketiminoxy, acyloxy and enoxy group and preferably Y is an alkoxy, acyloxy, enoxy, ketiminoxy or oxime group, and
iii. the symbol a=3 or 4.

The crosslinking agent B contains at least three hydrolyzable and condensable groups Y such as the groups having the following formulae:
acyloxy of formula —O—CO—R'
alkoxy of formula —O—R'
amino of formula —NR$^1$R$^2$
amido of formula —NR$^1$COR$^2$
alkenyloxy of formula —O—CR$^1$=CHR$^2$
aminoxy of formula —O—NR$^1$R$^2$
ketiminoxy of formula —O—N=CR$^1$R$^2$ or

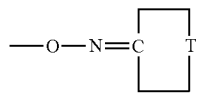

in which formulae: R' represents an alkyl or aryl radical containing from 1 to 15 carbon atoms, R$^1$ and R$^2$, which may be identical or different, represent alkyl or aryl radicals containing from 1 to 8 carbon atoms and T represents an alkylene radical containing from 4 to 8 carbon atoms. Among the radicals R', R$^1$ and R$^2$, mention may be made most particularly of the following radicals: methyl, ethyl, cyclohexyl and phenyl. Among the radicals T, mention may be made most particularly of those of formula: —(CH$_2$)$_4$—, —(CH$_2$)$_5$— and —(CH$_2$)$_6$—.

As examples of alkoxysilanes, mention may be made of those of formula:

Si(OCH$_3$)$_4$

Si(OCH$_2$CH$_3$)$_4$

Si(OCH$_2$CH$_2$CH$_3$)$_4$ (CH$_3$O)$_3$SiCH$_3$ (C$_2$H$_5$O)$_3$SiCH$_3$ (CH$_3$O)$_3$Si(CH=CH$_2$)

(C$_2$H$_5$O)$_3$Si(CH=CH$_2$)

(CH$_3$O)$_3$Si(CH$_2$—CH=CH$_2$)

(CH$_3$O)$_3$Si[CH$_2$—(CH$_3$)C=CH$_2$]

(C$_2$H$_5$O)$_3$S(OCH$_3$)

Si(OCH$_2$—CH$_2$—OCH$_3$)$_4$

CH$_3$Si(OCH$_2$—CH$_2$—OCH$_3$)$_3$ (CH$_2$=CH)Si(OCH$_2$CH$_2$OCH$_3$)$_3$

C$_6$H$_5$Si(OCH$_3$)$_3$

C$_6$H$_5$Si(OCH$_2$—CH$_2$—OCH$_3$)$_3$.

Ketiminoxysilane crosslinking agents have been known for a long time. They are described, for example, in French patents FR-A-1 314 649, FR-A-1 371 250, American patents U.S. Pat. No. 3,678,003 and U.S. Pat. No. 3,986,999, British patent GB-A-1 468 467, Belgian patent BE-A-901 479 and European patent EP-A-157 580.

As examples of ketiminoxysilanes, mention may be made of those of formula:

CH$_3$Si[—O—N=C(CH$_3$)$_2$]$_3$,

CH$_3$Si[—O—N=C(CH$_3$)C$_2$H$_5$]$_3$,

CH$_2$=CHSi[—O—N=C(CH$_3$)C$_2$H$_5$]$_3$,

C$_6$H$_5$Si[—O—N=C(CH$_3$)$_2$]$_3$,

CH$_3$Si[—O—N=C(C$_2$H$_5$)(CH$_2$)$_3$CH$_3$]$_3$, (CH$_3$)$_2$C=N—O—]Si[—O—N=C(CH$_3$)C$_2$H$_5$]$_3$,

CH$_3$Si[—O—N=C(CH$_3$CH(C$_2$H$_5$)(CH$_2$)$_3$CH$_3$]$_3$,

CH$_3$Si[—O—N=C(CH$_3$CH(C$_2$H$_5$)(CH$_2$)$_3$CH$_3$]$_3$,

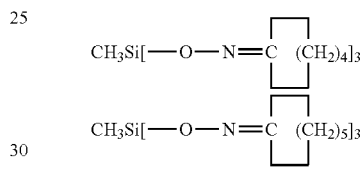

Acyloxysilane crosslinking agents have been known for a long time. They are described especially in patents U.S. Pat. No. 3,077,465, U.S. Pat. No. 3,382,205, U.S. Pat. No. 3,701,753, U.S. Pat. No. 3,957,714, U.S. Pat. No. 4,115,356, U.S. Pat. No. 4,273,698, FR-A-2 429 811 and FR-A-2 459 820.

As examples of acyloxysilanes, mention may be made of those of formula:

CH$_3$Si(OCOCH$_3$)$_3$,

C$_2$H$_5$Si(OCOCH$_3$)$_3$

CH$_2$=CHSi(OCOCH$_3$)$_3$

C$_6$H$_5$Si(OCOCH$_3$)$_3$,

CH$_3$Si[OCOCH(C$_2$H$_5$)—(CH$_2$)$_3$—CH$_3$]$_3$ (CF$_3$CH$_2$CH$_2$)Si(OCOC$_6$H$_5$)$_3$

CH$_3$Si(OCOCH$_3$)$_2$[OCOCH(C$_2$H$_5$)—(CH$_2$)$_3$—CH$_3$]

(CH$_3$COO)Si[OCOCH(C$_2$H$_5$)—(CH$_2$)$_3$—CH$_3$]$_3$

As other examples of crosslinking agents B, mention may be made of:
silanes and the products of partial hydrolysis of this silane having the following general formula:

R$^1_k$Si(OR$^2$)$_{(4-k)}$ in which:
the symbols R$^2$, which may be identical or different, represent alkyl radicals containing from 1 to 8 carbon atoms, such as methyl, ethyl, propyl, butyl, pentyl, 2-ethylhexyl radicals, C$_3$-C$_6$ oxyalkylene radicals, and the symbol R$^1$ represents a saturated or unsaturated, linear or branched aliphatic hydrocarbon-based group, a saturated or unsaturated and/or aromatic, monocyclic or polycyclic carbocyclic group and k is equal to 0, 1 or 2.

As other examples of crosslinking agents B, mention may be made of poly(ethylsilicate) or poly(n-propyl) silicate.

Use is generally made of from 0.1 to 60 parts by weight of crosslinking agent B per 100 parts by weight of the organosilicon compound(s) (A) capable of crosslinking by condensation into a solid silicone elastomer.

Preferably, the silicone composition (X) has a dynamic viscosity of greater than 50 000 mPa·s at 25° C. and preferably between 50 000 and 300 000 mPa·s at 25° C., so as to be able easily to coat the composition onto the flexible support (S).

As fillers (C), use may be made of mineral fillers, which are very finely divided products whose mean particle diameter is less than 0.1 μm. The fillers C, preferably reinforcing silicas, are generally used in a proportion of from 1 to 150 parts, preferably from 8 to 100 parts, per 100 parts of organosilicon compound A. They are chosen from combustion silicas and precipitation silicas. They have a specific surface area, measured according to the BET and CTAB methods, of between 50 m²/g and 500 m²/g, preferably between 70 m²/g and 500 m²/g, a mean primary particle size of less than 80 nanometers and an apparent density of less than 200 g/liter. These silicas may be incorporated in unmodified form or after having been treated with organosilicon compounds usually used for this purpose. Among these compounds are methylpolysiloxanes such as hexamethyldisiloxane, octamethylcyclotetrasiloxane, methylpolysilazanes such as hexamethyldisilazane, hexamethylcyclotrisilazane, chlorosilanes such as dimethyldichlorosilane, trimethylchlorosilane, methylvinyldichlorosilane, dimethylvinylchlorosilane, alkoxysilanes such as dimethyldimethoxysilane, dimethylvinylethoxysilane, trimethylmethoxysilane.

In addition to the reinforcing silicas or in place thereof, semi-reinforcing or bulking mineral fillers may be added. These fillers are coarser and have a mean particle diameter of greater than 0.1 μm. These fillers are more especially represented by ground quartz, calcined clays, diatomaceous silicas, calcium carbonate, optionally surface-treated, oxides of iron, titanium, magnesium or aluminum, zinc sulfate and barium sulfate. They are generally introduced in a proportion of from 1 to 120 parts by weight per 100 parts of organosilicon compound A. These mineral fillers may be used in unmodified form, i.e. untreated, or treated with the organosilicon compounds mentioned above in the case of the reinforcing silicas.

The purpose of introducing fillers is to give the composition good rheological characteristics before crosslinking and good mechanical characteristics of the elastomers resulting from the curing of the compositions in accordance with the invention.

In combination with these fillers, use may be made of mineral and/or organic pigments and also agents for improving the heat resistance (rare-earth metal salts and oxides such as ceric oxides and hydroxides) and/or the flame resistance of the elastomers. For example, the oxide cocktails described in international patent application WO 98/29488 may be used. Among the agents for improving the flame resistance, mention may be made of halogenated organic derivatives, organophosphorus derivatives, platinum derivatives such as chloroplatinic acid (the reaction products thereof with alkanols, ether oxides), platinous chloride-olefin complexes. These pigments and agents together represent not more than 20% of the weight of the fillers.

The composition according to the invention may also comprise at least one adhesion promoter (D), for instance organosilicon compounds simultaneously bearing:
(1) one or more hydrolyzable groups bonded to the silicon atom, and
(2) one or more organic groups substituted with radicals comprising a nitrogen atom or chosen from the group of (meth)acrylate, epoxy and alkenyl radicals, and even more preferentially from the group formed by the following compounds, taken alone or as a mixture:
vinyltrimethoxysilane (VTMO),
3-glycidoxypropyl-trimethoxysilane (GLYMO),
methacryloxypropyltrimethoxysilane (MEMO),

[H$_2$N(CH$_2$)$_3$]Si(OCH$_2$CH$_2$CH$_3$)$_3$,

[H$_2$N(CH$_2$)$_3$]Si(OCH$_3$)$_3$

[H$_2$N(CH$_2$)$_3$]Si(OC$_2$H$_5$)$_3$

[H$_2$N(CH$_2$)$_4$]Si(OCH$_3$)$_3$

[H$_2$NCH$_2$CH(CH$_3$)CH$_2$CH$_2$]SiCH$_3$(OCH$_3$)$_2$

[H$_2$NCH$_2$]Si(OCH$_3$)$_3$

[n-C$_4$H$_9$—NH—CH$_2$]Si(OCH$_3$)$_3$

[H$_2$N(CH$_2$)$_2$NH(CH$_2$)$_3$]Si(OCH$_3$)$_3$

[H$_2$N(CH$_2$)$_2$NH(CH$_2$)$_3$]Si(OCH$_2$CH$_2$OCH$_3$)$_3$

[CH$_3$NH(CH$_2$)$_2$NH(CH$_2$)$_3$]Si(OCH$_3$)$_3$

[H(NHCH$_2$CH$_2$)$_2$NH(CH$_2$)$_3$]Si(OCH$_3$)$_3$

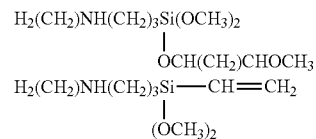

or polyorganosiloxane oligomers containing such organic groups in a content of greater than 20%.

Besides the main constituents, unreactive linear polyorganosiloxane polymers (E) may be introduced for the purpose of acting on the physical characteristics of the compositions in accordance with the invention and/or on the mechanical properties of the elastomers derived from the curing of these compositions.

These unreactive linear polyorganosiloxane polymers (E) are well known; they more especially comprise: α,ω-bis(triorganosiloxy) diorganopolysiloxane polymers with viscosities of at least 10 mPa·s at 25° C., formed essentially from diorganosiloxy units and not more than 1% of monoorganosiloxy and/or siloxy units, the organic radicals bonded to the silicon atoms being chosen from methyl, vinyl and phenyl radicals, at least 60% of these organic radicals being methyl radicals. The viscosity of these polymers may exceed 1 000 000 mPa·s at 25° C. They thus comprise oils of fluid to viscous aspect and soft to hard gums. They are prepared according to the usual techniques described more precisely in French patents FR-A-978 058, FR-A-1 025 150, FR-A-1 108 764, FR-A-1 370 884. Use is preferably made of α,ω-bis(trimethylsiloxy) dimethylpolysiloxane oils with a viscosity ranging from mPa·s to 1 000 mPa·s at 25° C. These polymers which act as plasticizers may be introduced in a proportion of not more than 70 parts by weight, preferably from 5 to 20 parts by weight, per 100 parts by weight of the organosilicon compound A.

The compositions according to the invention may also advantageously comprise at least one silicon resin (F). These silicone resins are well-known, commercially available branched organopolysiloxane polymers. They bear, per molecule, at least two different units chosen from those of formula $R'''_3SiO_{1/2}$ (unit M), $R'''_2SiO_{2/2}$ (unit D), $R'''SiO_{3/2}$ (unit T) and $SiO_{4/2}$ (unit Q) with at least one of the units being a unit T or Q. The radicals R''' are identical or different and are chosen from linear or branched alkyl radicals, vinyl, phenyl, 3,3,3-trifluoropropyl radicals. Preferably, the alkyl radicals contain from 1 to 6 carbon atoms. More particularly, examples of alkyl radicals R that may be mentioned include: methyl, ethyl, isopropyl, tert-butyl and n-hexyl radicals. These resins are preferably hydroxylated and, in this case, have a weight proportion of hydroxyl group of between 5 and 500 meq/100 g. As examples of resins, mention may be made of MQ resins, MDQ resins, TD resins and MDT resins.

Other common auxiliary agents and additives may be incorporated into the composition according to the invention; they are chosen as a function of the applications in which said compositions are used.

Composition (X) according to the invention may comprise the following amounts:
- per 100 parts by weight of at least one organosilicon compound (A) comprising at least two identical or different hydrolyzable and condensable groups, or at least two silanol functions ≡SiOH,
- from 0.1 to 60 parts by weight, preferably from 1 to 15 parts by weight, of at least one crosslinking agent (B) as defined above,
- from 0 to 150 parts by weight of at least one filler (C), and preferably from 1 to 150 parts by weight,
- from 0 to 20 parts by weight of at least one adhesion promoter (D),
- from 0 to 150 parts by weight of at least one unreactive linear polyorganosiloxane polymer (E),
- from 0 to 50 parts by weight of at least one silicone resin (F), and
- a catalytically effective amount of at least one catalyst (M) which is a magnesium complex comprising in its structure two identical or different carboxylate ligands, comprising from 10 to 32 carbon atoms, preferably from 10 to 20 carbon atoms, preferably an amount of between 0.05 and 10% by weight relative to the total weight of the composition, and even more preferentially an amount of between 0.10 and 5% by weight relative to the total weight of the composition.

When the flexible support S is a textile such as a lace, it is particularly advantageous to use a composition (X) comprising:
- per 100 parts by weight of at least one organosilicon compound (A) comprising at least two silanol functions ≡SiOH, and preferably an α,ω-hydroxylated polydiorganosiloxane of formula (A') described above in which the symbols $R^2$ are methyl groups and n is between 3 and 2000, and preferably between 3 and 1000,
- from 0.1 to 60 parts by weight, preferably from 1 to 15 parts by weight, of at least one crosslinking agent (B), and even more preferentially from 1 to 15 parts by weight of at least one crosslinking agent (B) which is a silane of formula (5) described above with the symbol R' being a monovalent hydrocarbon-based radical comprising from 1 to 30 carbon atoms and the symbol Y being an acyloxy radical of formula —O—CO—R', with R' being an alkyl radical containing from 1 to 15 carbon atoms,
- from 0 to 150 parts by weight of at least one filler (C), and preferably from 1 to 50 parts by weight of at least one filler (C),
- from 0 to 20 parts by weight of at least one adhesion promoter (D),
- from 0 to 150 parts by weight of at least one unreactive linear polyorganosiloxane polymer (E), and preferably from 1 to 50 parts by weight of at least one unreactive linear polyorganosiloxane polymer (E),
- from 0 to 50 parts by weight of at least one silicone resin (F), and
- a catalytically effective amount of at least one catalyst (M) which is a magnesium complex comprising in its structure two identical or different carboxylate ligands, comprising from 10 to 32 carbon atoms, preferably from 10 to 20 carbon atoms, preferably an amount of between 0.05 and 10% by weight relative to the total weight of the composition, and even more preferentially an amount of between 0.10 and 5% by weight relative to the total weight of the composition.

According to one variant of the invention, composition (X) according to the invention does not contain any catalyst having in its structure at least one tin atom.

The present invention also relates to the use of the liquid silicone composition (X) that is crosslinkable via condensation reactions according to the invention and as defined above, for coating a flexible support (S).

Another subject of the invention relates to a liquid silicone composition (X) that is crosslinkable via condensation reactions as defined above. It has the advantage of:
- being able to avoid the blocking problems when it is coated and to crosslink on a flexible support S, and
- obtaining transparent or translucent solid silicone elastomers after crosslinking on contact with humidity from the air.

Another subject of the invention relates to a solid silicone elastomer obtained by crosslinking in the presence of humidity provided by the ambient air of the composition (X) as described above.

Another subject of the invention, the invention relates to a one-pack composition RTV-1 in the form of a single airtight pack P comprising composition (X) as described above.

The one-pack RTV-1 composition according to the invention is in a single part. It is stable on storage in the absence of water and cures in the presence of water to form a solid elastomer. It may be manufactured by mixing the various constituents in the absence of humidity, with or without heating. The catalyst is preferably incorporated at the end. Preferably, the mixing is performed under reduced pressure to promote the loss of the volatile materials. Thus stored in a confined medium and protected against the presence of water and of humidity from the air, the one-pack RTV-1 composition according to the invention is stable on storage for several months. The one-pack RTV-1 compositions, in accordance with the invention, are used in unmodified form, i.e. undiluted, or in the form of dispersions in diluents, and are stable on storage in the absence of humidity or of water and cure at and above low temperatures (after loss of the solvents in the case of dispersions) in the presence of water to form solid silicone elastomers.

A final subject of the invention relates to a two-pack RTV-2 composition which is a precursor of composition (X) as defined above, which is in two distinct packs P1 and P2, characterized in that:

a) pack P1 is airtight and comprises:
a catalytically effective amount of at least one catalyst (M) which is a magnesium complex comprising in its structure two identical or different carboxylate ligands, comprising from 10 to 32 carbon atoms, preferably an amount of between 0.05% and 10% by weight and even more preferentially an amount of between 0.10 and 5% by weight relative to the total weight of the composition obtained after mixing the parts P1 and P2, and
at least one crosslinking agent (B), and b) pack P2 contains neither said catalyst (M) nor said crosslinking agent (B) and comprises:
per 100 parts by weight of at least one organosilicon compound (A) comprising at least two identical or different hydrolyzable and condensable groups, or at least two silanol functions=SiOH, and
from 0 to 10 parts by weight of water.

A two-pack RTV-2 composition is in two distinct packs: P1 which contains the catalyst and is airtight, and P2. They are conditioned after incorporating the catalyst as two separate fractions, one of the fractions possibly containing, for example, only the catalyst according to the invention or a mixture with the crosslinking agent. The manufacture of the two-pack RTV-2 compositions in accordance with the invention is also performed by mixing the various constituents in suitable machines. Two-pack RTV-2 compositions are described in detail, for example, in patents EP 118 325, EP 117 772, EP 10 478, EP 50 358, EP 184 966, U.S. Pat. No. 3,801,572 and U.S. Pat. No. 3,888,815, mentioned as reference.

The two-pack RTV-2 composition makes it possible, after mixing of the two parts P1 and P2, to obtain composition (X) according to the invention. It is a "precursor" composition of the composition according to the invention. Each part of the two-pack RTV-2 composition may be manufactured by mixing the various constituents. The two parts may be stored and sold in the form of a kit. During its use, the two parts are mixed, and this mixture may be deposited onto a flexible support S. The layer deposited may have a variable thickness, generally between 0.15 mm and several centimeters, preferably between 1 mm and 1 cm. The placing in contact of the polyorganosiloxane A, of water and of compound C which acts as catalyst triggers the reactions leading to the curing of the composition until a solid silicone elastomer is obtained.

Other details or advantages of the invention will emerge more clearly in the light of the examples given below purely as a guide.

EXAMPLES

Example 1: Preparation or Origin of the Catalysts a) Catalyst (I-1): Magnesium Bis-Neodecanoate [(Mg (ND) 2)]
CAS No.: 57453-97-1; ND=neodecanoate anion.
$Mg(OEt)_2$+2 mol of neodecanoic acid+toluene→[Mg $(ND)_2$]+2 EtOH
31.41 g of magnesium ethoxide (0.274 mol) and 150 ml of toluene are placed in a 500 ml round-bottomed flask. Two equivalents of neodecanoic acid (94.92 g) are added. The heterogeneous mixture is stirred at a temperature of 20° C. until the grains of magnesium ethoxide have disappeared. The solution is then heated to 125° C. to distill off the toluene-ethanol azeotrope, i.e. for 2 hours. The solution obtained after cooling is filtered through a No. 3 sinter, concentrated again to obtain 200 g of solution containing 50% by weight of magnesium neodecanoate, which is clear and pale yellow to orange (quantitative yield).

b) Catalyst (I-2): Magnesium Bis-Naphthenate [Mg $(Naphthenate)_2$]
$Mg(OEt)_2$+2 mol of naphthenic acid ($C_{14}$-$C_{15}$)+toluene→ [Mg(naphthenate)$_2$]+2 EtOH
6.96 g of magnesium ethoxide (60.5 mmol) and 30 ml of toluene are placed in a 100 ml round-bottomed flask. Two equivalents of aliphatic naphthenic acid (mixture of $C_{14}$-$C_{15}$ alkylcyclopentane) with a mean molecular mass of 236.8 g/mol (28.65 g) are added in a single portion. The heterogeneous mixture is stirred at a temperature of 20° C. until the last grains of magnesium ethoxide have disappeared. The solution is then heated to 125° C. to distill off the toluene-ethanol azeotrope, i.e. for 2 hours. The solution obtained after cooling is filtered through a No. 3 sinter and concentrated again to obtain 60 g of a solution containing 50% by weight of magnesium naphthenate of red color (quantitative yield).

c) Catalyst (C-1) Magnesium Bis-2-ethylhexanoate [Mg (2-ethylhexanoate)$_2$]
CAS No.: 15602-15-0
$Mg(OEt)_2$+2 2-ethylhexanoic acid+toluene→[Mg(2-ethylhexanoate)$_2$]+2 EtOH
11.114 g of magnesium ethoxide (96.5 mmol) and 30 ml of toluene are placed in a 100 ml round-bottomed flask. Two equivalents of 2-ethylhexanoic acid (28.13 g) are added in a single portion. The heterogeneous mixture is stirred at a temperature of 20° C. until the last grains of magnesium ethoxide have disappeared. The solution is then heated to 125° C. to distill off the toluene-ethanol azeotrope, i.e. for 2 hours. The solution obtained after cooling is filtered through a No. 3 sinter and concentrated again to obtain 60 g of a solution containing 50% by weight of magnesium 2-ethylhexanoate and is rediluted to 40% (total 75 g) to give a clear orange oil.

d) Catalyst (C-2) Calcium Bis-Neodecanoate [Ca(ND)$_2$]
CAS No.: 27253-33-4-ND=neodecanoate anion Ca(OMe)$_2$+2 neodecanoic acid+toluene→[Ca(ND)$_2$]+2 MeOH
4.8 g of 97% calcium methoxide (47 mmol) and 25 ml of toluene are placed in a 100 ml round-bottomed flask. Two equivalents of neodecanoic acid (16.28 g) are added over 20 minutes. The heterogeneous mixture is stirred at a temperature of 20° C. until the last grains of calcium methoxide have disappeared. The solution is then heated to 100° C. to distill off the toluene-methanol azeotrope, i.e. for 2 hours. The solution obtained after cooling is filtered through a No. 3 sinter and then diluted with toluene to obtain a solution containing 30% by weight of calcium neodecanoate (60 g) that is virtually colorless and clear.

e) Catalyst (C-3) Lithium Neodecanoate [Li(ND)]
CAS No.: 27253-30-1 ND=neodecanoate anion
LiOH.H$_2$O+MeOH/EtOH=neodecanoic acid→LiND
6.09 g of lithium hydroxide hydrate (145.1 mmol) and 90 ml of methanol are placed in a 250 ml round-bottomed flask, and 25 g of neodecanoic acid (145.1 mmol) diluted in 80 ml of ethanol are then added to the suspension obtained. After stirring for 1 hour, the milky solution is filtered and then evaporated to dryness to give a white solid as a foam. This is dissolved with the same mass of ethanol (25.8 g) to give a clear solution at 50% by weight of lithium neodecanoate.

f) Catalyst (C-4): Strontium bis(2-ethylhexanoate)-[Sr(Oct)$_2$]

CAS No.: 2457-02-5, Oct=bis(2-ethylhexanoate) anion; Sold by the company ABCR GmbH 7 Co. KG.

g) Catalyst (C-5): Zinc Neodecanoate [Zn(Nd)$_2$]

ND=neodecanoate anion; sold by the company Shepherd Chemical Company.

h) Catalyst (C-6): tetra-n-butyl titanate [Ti(O-butyl)$_4$]

CAS No.: 5593-70-4; Tyzor® TnBT sold by the company Dorf Ketal Specialty Catalyst LLC.

i) Catalyst (C-7): dioctyltin dilaurate (DOctSnDL) Metatin® 812 sold by the company ACIMA.

Example 2: Preparation of the Liquid Silicone Compositions that are Crosslinkable Via Condensation Reactions 40 g of a slurry constituted by:
- 74% by weight of an α,ω(dimethyl)hydroxysilyl polydimethylsiloxane oil with a dynamic viscosity at 25° C. of 50 000 mPa·s,
- 6.2% by weight of an α,ωdimethyl)hydroxysilyl polydimethylsiloxane oil with a dynamic viscosity at 25° C. of 14 000 mPa·s,
- 6.4% by weight of a silica Aerosil®200 (BET specific surface area=200 m$^2$/g) which has been surface-treated with hexamethyldisilazane,
- 3.9% by weight of a silica Aerosil®200 (BET specific surface area=200 m$^2$/g), and
- 9.5% by weight of a polydimethylsiloxane oil with a dynamic viscosity at 25° C. of 500 mPa·s, are placed in a 185 ml plastic jar.

1.62 g of a crosslinking agent XL1 sold by the company Nitrochemie (mixture of methyltriacetoxysilane and ethyltriacetoxysilane) are then added. The mixture is stirred with a Speed Mixer (DAC 150 FV from the company Hauschild) for 25 seconds and at a spin speed of 1800 rpm. An amount, expressed as a weight percentage relative to the total weight of the composition, of test catalyst (pure or in an organic solvent) is then added, followed by mixing using a speed mixer for 25 seconds at 1800 rpm, before conditioning the final mixture in a leaktight cartridge.

For the transparency measurements, the compositions are also debubbled in the following manner: the jar containing the silicone composition is placed under a bell jar, the lid is removed and a negative pressure of about 0.09 MPa is then gradually applied for about 5 min; the system is then returned to ambient pressure. This operation is repeated once or twice so as to remove all the bubbles in the compositions to be evaluated after coating and crosslinking on a flexible support.

Example 3: Coating on a Flexible Support of Lace Type 3.1) Coating Process

A polyamide and elastane lace is attached to a wooden support allowing it to be pulled slightly taut, and a metal plate is placed under the lace. The test silicone composition prepared according to Example 2 is spread on a support (lace made of polyamide and elastane) in the form of two uniform strips, which are formed by passing over them a doctor blade or a metal film drawer in the form of two strips 1 cm wide. After having removed the metal plate, crosslinking is performed in a climatic chamber (Weiss type), optionally after preliminary treatment (for 15 seconds) in a pressure cooker that generates water vapor. After crosslinking the thickness of the solid silicone elastomer coat is between 0.25 and 0.60 mm (checked by means of a micrometer or Palmer). The "blocking" results for the various test catalysts are given in tables 1 to 10 below.

3.2) Results 3.2.1) Measurement of the "Blocking":

On exiting the oven or the climatic chamber, the coated fabric is folded on itself so as to produce silicone-against-silicone bonding over a length of at least 13 cm (the width is controlled by the width of the doctor blade and the thickness of the coating is controlled with a comparator or Palmer). Unless otherwise mentioned, this measurement is performed by peeling with a tensile testing machine on a lace (made of polyamide and elastane) coated with two silicone strips 1 cm wide and folded on itself immediately on exiting the oven, and after application of a 600 g weight for 24 hours or 300 g for 48 hours. The coating thickness is generally between 0.25 and 0.60 mm. The blocking force is then measured by peeling with a Zwick tensile testing machine, which gives the value of the peel force (expressed in the tables in N for a 2 cm peel front). The peeling speed is 100 mm/min. The maximum value of the force required for detachment (Fmax, unit N) and the mean of the five highest values are measured (referred to as "blocking", unit N). The lower the values, the less the "blocking" phenomenon is present.

TABLE 1

Measurement of the "blocking" obtained - catalyst (I-1) added in a diluted form (content of 40% by weight) in neodecanoic acid - coatings crosslinked in a climatic chamber for 10 min at 80° C. and regulated at 20% relative humidity (RH).

| Compositions | Catalyst (I-1) [Mg(ND)$_2$] Weight % relative to the total weight of the composition | Number of mmol of catalyst (I-1) per 100 g of composition | Thickness of the solid silicone coat after crosslinking min-max (mm) | "Blocking" (N) | Fmax (N) |
|---|---|---|---|---|---|
| Inv-1 | 0.36 | 0.98 mmol | 0.39-0.53 | 2.0 | 2.2 |
| Inv-2 | 0.29 | 0.79 mmol | 0.23-0.47 | 1.6 | 1.8 |
| Inv-3 | 0.26 | 0.71 mmol | 0.30-0.63 | 1.3 | 1.4 |
| Inv-4 | 0.24 | 0.65 mmol | 0.42-0.63 | 1.0 | 1.3 |

The results regarding the "blocking" are suitable for the application.

TABLE 2

Study of the accelerated aging of composition Inv-2, stored beforehand in a leaktight cartridge (RTV-1) at 40° C. for 30 or 60 days. Followed by coating according to paragraph 3.1) and crosslinking for 10 min in a climatic chamber regulated at 80° C. and 20% RH.

| Aging time at 40° C. leaktight cartridge (days) | Thickness of the solid silicone coat after crosslinking min-max (mm) | "Blocking" (N) | Fmax (N) |
|---|---|---|---|
| 0 | 0.32-0.43 | 1.6 | 1.8 |
| 30 | 0.30-0.50 | 1.7 | 1.8 |
| 60 | 0.41-0.54 | 1.9 | 2.4 |

The composition Inv-2 according to the invention, containing the catalyst (I-1) ([Mg(ND)$_2$]), has good aging properties since no increase in "blocking" is observed for a composition stored in a leaktight cartridge.

The compositions according to the invention may be conditioned in RTV-1 form (airtight pack) and stored without degrading the properties of the elastomer obtained after coating (absence of "blocking").

TABLE 3

Measurement of the "blocking" obtained with a composition comprising catalyst (I-2) [Mg(naphthenate)$_2$] added in a diluted form (content 50% by weight) in toluene - coatings crosslinked in a climatic chamber for 10 min at 80° C. and regulated at 20% relative humidity (RH).

| Compositions | Catalyst (I-1) [Mg(naphthenate)$_2$] Weight % relative to the total weight of the composition | Number of mmol of catalyst (I-2) per 100 g of composition | Thickness of the solid silicone coat after crosslinking min-max (mm) | "Blocking" (N) | Fmax (N) |
|---|---|---|---|---|---|
| Inv-5 | 0.50 | 1 mmol | 0.41-0.56 | 1.36 | 2.88 |

The results regarding the "blocking" are appropriate for the application.

TABLE 4

Measurement of the "blocking" obtained with the catalyst (C-1) magnesium bis-2-ethylhexanoate [Mg(2-ethylhexanoate)$_2$] added in a diluted form (content 40% by weight) in toluene - coatings crosslinked in a climatic chamber for 10 min at 80° C. and regulated at 20% relative humidity (RH).

| Compositions | Catalyst (C-1) [Mg(2-ethylhexanoate)$_2$] Weight % relative to the total weight of the composition | Number of mmol of catalyst (C-1) per 100 g of composition | Thickness of the solid silicone coat after crosslinking min-max (mm) | "Blocking" (N) | Fmax (N) |
|---|---|---|---|---|---|
| Comp-1 | 0.40 | 1.25 mmol | 0.30-0.47 | 7.4 | 8.3 |
| Comp-2 | 0.35 | 1.12 mmol | 0.26-0.42 | 8.1 | 9.4 |
| Comp-3 | 0.30 | 0.97 mmol | 0.36-0.67 | 25.3 | 29.1 |
| Comp-4 | 0.26 | 0.83 mmol | 0.29-0.39 | 20.5 | 29.1 |

The "blocking" values observed for catalyst (C-1) (magnesium bis-2-ethylhexanoate, [Mg(2-ethylhexanoate)$_2$]) are not satisfactory for the application (excessively high "blocking").

TABLE 5

Measurement of the "blocking" observed with catalyst (C-2) calcium bis-neodecanoate [Ca(ND)$_2$] - Coatings crosslinked in a climatic chamber for 10 min at 80° C. and regulated at 20% relative humidity (RH).

| Compositions | Catalyst (C-2) [Ca(ND)$_2$] Weight % relative to the total weight of the composition | Number of mmol of catalyst (C-2) per 100 g of composition | Thickness of the solid silicone coat after crosslinking min-max (mm) | "Blocking" (N) | Fmax (N) |
|---|---|---|---|---|---|
| Comp-5 | 2.50 | 6.60 mmol | 0.31-0.40 | 17.3 | 18.6 |
| Comp-6 | 1.75 | 4.57 mmol | 0.35-0.54 | 28.5 | 30.0 |
| Comp-7 | 1.44 | 3.77 mmol | 0.25-0.36 | 27.0 | 28.3 |

It was necessary to add amounts >2% by weight of [Ca(ND)$_2$] relative to the total weight of the composition in order to obtain crosslinking. The "blocking" values observed for catalyst (C-2) (calcium bis-neodecanoate [Ca(ND)$_2$]) are not satisfactory for the application (excessively high "blocking").

TABLE 6

Measurement of the "blocking" obtained with catalyst (C-3) lithium neodecanoate [Li(ND)] - Coatings crosslinked in a climatic chamber for 10 min at 80° C. and regulated at 20% relative humidity (RH).

| Compositions | Catalyst (C-3) [Li(ND)] Weight % relative to the total weight of the composition | Number of mmol of catalyst (C-3) per 100 g of composition | Thickness of the solid silicone coat after crosslinking min-max (mm) | "Blocking" (N) | Fmax (N) |
|---|---|---|---|---|---|
| Comp-8 | 1.40 | 3.92 mmol | 0.34-0.42 | 23.2 | 26.3 |
| Comp-9 | 0.70 | 1.96 mmol | 0.28-0.36 | 10.0 | 11.6 |

The "blocking" values observed for catalyst (C-3) lithium neodecanoate [Li(ND)] are not satisfactory for the application (excessively high "blocking").

TABLE 7

Measurement of the "blocking" obtained with catalyst (C-4): strontium bis(2-ethylhexanoate)-[Sr(Oct)$_2$] - Coatings crosslinked in a climatic chamber for 10 min at 80° C. and regulated at 20% relative humidity (RH).

| Compositions | Catalyst (C-4) [Sr(Oct)$_2$] Weight % relative to the total weight of the composition | Number of mmol of catalyst (C-4) per 100 g of composition | Thickness of the solid silicone coat after crosslinking min-max (mm) | "Blocking" (N) | Fmax (N) |
|---|---|---|---|---|---|
| Comp-10 | 0.48 | 1.28 mmol | 0.36-0.47 | 29.5 | 32.7 |
| Comp-11 | 0.28 | 0.75 mmol | 0.39-0.46 | 28.7 | 29.7 |

The "blocking" values observed for catalyst (C-4): strontium bis(2-ethylhexanoate)-[Sr(Oct)$_2$] are not satisfactory for the application (excessively high "blocking").

TABLE 8

Measurement of the "blocking" obtained with catalyst (C-5): Zinc neodecanoate [Zn(ND)$_2$] - Coatings crosslinked in a climatic chamber for 10 min at 80° C. and regulated at 20% relative humidity (RH).

| Compositions | Catalyst (C-5) [Zn(ND)$_2$] Weight % relative to the total weight of the composition | Number of mmol of catalyst (C-5) per 100 g of composition | Thickness of the solid silicone coat after crosslinking min-max (mm) | "Blocking" (N) | Fmax (N) |
|---|---|---|---|---|---|
| Comp-12 | 1.25 | 3.06 mmol | 0.44-0.57 | 4.1 | 5 |
| Comp-13 | 0.62 | 1.52 mmol | 0.35-0.49 | 8.5 | 9.3 |

The "blocking" values observed for catalyst (C-5) (zinc neodecanoate [Zn(ND)$_2$]) are not satisfactory for the application (excessively high "blocking").

TABLE 9

Measurement of the "blocking" obtained with catalyst (C-6): tetra-n-butyl titanate [Ti(O-butyl)$_4$].

| Compositions | Catalyst (C-6) [Ti(O-butyl)$_4$] Weight % relative to the total weight of the composition | Thickness of the solid silicone coat after crosslinking min-max (mm) | "Blocking" (N) | Fmax (N) |
|---|---|---|---|---|
| Comp-14 | 0.019 | 0.35-0.53 | 17.3 | 18.6 |
| Comp-15 | 0.029 | 0.32-0.43 | 16.5 | 20.16 |
| Comp-16 | 0.015 | 0.34-0.43 | 21.6 | 23.0 |
| Comp-17 | 0.010 | 0.40-0.49 | 21.5 | 24.05 |

For composition Comp-14: coating crosslinked in a climatic chamber for 10 min at 80° C. and regulated at 20% relative humidity (RH). However, at this level of humidity, the coating becomes too opaque.

For compositions Comp-15, Comp-16 and Comp-17: coating crosslinked in a climatic chamber for 10 min at 80° C. and regulated at 10% relative humidity (RH).

The "blocking" values observed for catalyst (C-6): tetra-n-butyl titanate [Ti(O-butyl)$_4$] are not satisfactory for the application (excessively high "blocking")

TABLE 10

Measurement of the "blocking" obtained with catalyst (C-7): Dioctyltin dilaurate (DOTDL) - Coatings crosslinked in a climatic chamber for 10 min at 80° C. and regulated at 20% relative humidity (RH).

| Compositions | Catalyst (C-7) (DOTDL) Weight % relative to the total weight of the composition | Thickness of the solid silicone coat after crosslinking min-max (mm) | "Blocking" (N) | Fmax (N) |
|---|---|---|---|---|
| Comp-18 | 0.063 | 0.42-0.47 | 2.1 | 2.7 |

3.2.2) Transparency Measurement:

The silicone composition to be tested is coated, according to the procedure described in Example 3 paragraph 3.1, on a Terphane® transparent film (flexible support made of polyethylene glycol terephthalate) and crosslinked under controlled thickness, time, temperature and relative humidity conditions (crosslinking 10 min in humid chamber, temperature=80° C. and 20% relative humidity). The level of optical transmission is then characterized by means of a UV/visible spectrophotometer (Evolution 201 from the company ThermoScientific), at a wavelength of 500 nm. Unless otherwise mentioned, the thickness of the silicone coating for the transparency measurements is adjusted to 0.3 mm. It should be noted that at this wavelength, the Terphane film alone (without any solid silicone coat) has a transparency of 76%. The results are collated in Table 11 below.

TABLE 11

Transparency measurement - On Terphane ® film, coatings crosslinked in a climatic chamber for 10 min at 80° C. and regulated at 20% relative humidity (RH).

| Compositions | Test catalyst | Concentration (%) | Transparency (%) |
|---|---|---|---|
| Inv-6 | (I-1) [Mg(ND)$_2$] | 0.42 | 68 |
| Comp-19 | (C-5) [Zn(ND)$_2$] | 1.20 | 54 |
| Comp-20 | (C-6) [Ti(O-butyl)$_4$] | 0.02 | 49 |
| Comp-21 | (C-7) DOTDL | 0.06 | 70 |

When catalyst (I-1), which is magnesium neodecanoate [Mg(ND)$_2$], is used according to the invention, films whose transparency is very similar to that obtained with a tin-based catalyst are obtained (composition Comp-21).

Example 4: Measurement of the Physical Properties after Crosslinking at Room Temperature (23° C.)

4.1) Preparation of the Compositions
The following are placed in a blender:
100 g of an α,ω dihydroxylated polydimethylsiloxane oil of viscosity 50 000 mPa·s,
dispersion of 6.2 g (i.e. 5.6%) of a fumed silica of Aerosil® type, surface-treated with octamethyltetrasiloxane (D4) (specific surface area via the BET process of 300 m$^2$/g), and
4.5 g (i.e. 4.1%) of crosslinking agent XL1, sold by the company Nitrochemie and constituted by a mixture of methyltriacetoxysilane and ethyltriacetoxysilane.

Next, intimate mixing is performed by blending for about 1 minute with a Speedmixer (from the company Hauschild). The amount of catalyst to be tested (expressed as a weight percentage relative to the total weight of the composition) is then added, dispersed with a spatula and stirred for about 1 minute with a Speedmixer. This operation is followed by debubbling of the composition by placing under vacuum for about 5 minutes, followed by conditioning in an airtight cartridge (one-pack RTV-1).

4.2) Crosslinking at Room Temperature (23° C.)
Films 2 mm thick are spread with a doctor blade allowing the thickness to be controlled, and the silicone composition is left to crosslink in a conditioned room at 23° C. and 50% relative humidity.
The following are measured:
a) the skin formation time (SFT): time after which surface crosslinking is observed, and
b) the hardness (Shore A): this reflects formation of the three-dimensional network.

TABLE 12

Properties of solid silicone elastomer
It is observed that magnesium neodecanoate (I-1) is more reactive (+30%) than C$_8$ strontium carboxylate (C-4) and makes it possible to obtain improved properties of hardness at 24 hours.

| Catalyst | Catalyst dose (%) | SFT (minutes) | Hardness after 24 hours of crosslinking (Shore A) |
|---|---|---|---|
| (I-1) [Mg(ND)$_2$] | 0.84 | 10.5 | 17 |
| (C-4) [Sr(Oct)$_2$] | 0.86 | 13 | 15.6 |
| (C-7) DOTDL | 0.06 | 6.5 | 20.7 |

The invention claimed is:

1. A process for coating a liquid silicone composition that is crosslinkable via condensation reaction to form a solid silicone elastomer on a flexible support, comprising a), b) and c) below:
   a) a liquid silicone composition that is crosslinkable via condensation reactions is prepared, comprising:
      at least one organosilicon compound comprising at least two identical or different hydrolyzable and condensable groups, or at least two silanol functions SiOH,
      at least one crosslinking agent,
      optionally at least one filler, and
      a catalytically effective amount of at least one catalyst which is a magnesium complex comprising in a structure thereof, two identical or different carboxylate ligands, wherein each carboxylate ligand comprises from 10 to 32 carbon atoms,
   b) on a flexible support, which may optionally be pre-covered on one or two faces with one or more layers of a polymer material, said silicone composition is deposited continuously or discontinuously onto one face of said flexible support or optionally onto the two faces of said flexible support, and
   c) said silicone composition is left to crosslink in the presence of humidity provided by ambient air or by exposure to water vapor, or by prior addition of water to said silicone composition so as to form a crosslinked solid silicone elastomer.

2. The process as claimed in claim 1, in which, in b), a sufficient amount of said silicone composition is deposited so as to form either a bead or a continuous layer on said flexible support.

3. The process as claimed in claim 1, in which, in c), said silicone composition is left to crosslink in the presence of humidity provided by ambient air or by exposure to water vapor, or by prior addition of water to said silicone composition at a temperature of between 20 and 90° C.

4. The process as claimed in claim 1, wherein the catalyst is a complex of formula (1) below:

$$[Mg(C^1)_x(C^2)_y] \quad (1)$$

in which:
   the symbols $C^1$ and $C^2$ are identical or different ligands chosen from the group of carboxylates comprising from 10 to 32 carbon atoms,
   the symbols x and y represent the number of carboxylate ligands and are integers equal to 0, 1 or 2 with the condition that the sum x+y=2.

5. The process as claimed in claim 1, wherein the catalyst is a complex of formula (2) below:

$$[Mg(C^1)_2] \quad (2)$$

in which:
the symbol C¹ is a ligand chosen from the group of carboxylates comprising from 10 to 32 carbon atoms.

6. The process as claimed in claim 1, wherein the carboxylate ligands are selected from the group consisting of:
the anions: decanoate [CH$_3$—(CH$_2$)$_8$—COO]⁻, undecanoate [CH$_3$—(CH$_2$)$_9$—COO]⁻, dodecanoate or laurate [CH$_3$—(CH$_2$)$_{10}$—COO]⁻, tridecanoate [CH$_3$—(CH$_2$)$_{11}$—COO]⁻, tetradecanoate or myristate [CH$_3$—(CH$_2$)$_{12}$—COO]⁻, pentadecanoate [CH$_3$—(CH$_2$)$_{13}$—COO]⁻, hexadecanoate or palmitate [CH$_3$—(CH$_2$)$_{14}$—COO]⁻, heptadecanoate [CH$_3$—(CH$_2$)$_{15}$—COO]⁻, octadecanoate or stearate [CH$_3$—(CH$_2$)$_{16}$—COO]⁻, nonadecanoate [CH$_3$—(CH$_2$)$_{17}$—COO]⁻, eicosanoate [CH$_3$—(CH$_2$)$_{18}$—COO]⁻, heneicosanoate [CH$_3$—(CH$_2$)$_{19}$—COO]⁻, docosanoate or behenate [CH$_3$—(CH$_2$)$_{20}$—COO]⁻, tricosanoate [CH$_3$—(CH$_2$)$_{21}$—COO]⁻, tetracosanoate or lignocerate [CH$_3$—(CH$_2$)$_{22}$—COO]⁻, pentacosanoate [CH$_3$—(CH$_2$)$_{23}$—COO]⁻, hexacosanoate [CH$_3$—(CH$_2$)$_{24}$—COO]⁻, heptacosanoate acid [CH$_3$—(CH$_2$)$_{25}$—COO]⁻, octacosanoate [CH$_3$—(CH$_2$)$_{26}$—COO]⁻, nonacosanoate [CH$_3$—(CH$_2$)$_{27}$—COO]⁻, triacontanoate [CH$_3$—(CH$_2$)$_{28}$—COO]⁻, hentriacontanoate [CH$_3$—(CH$_2$)$_{29}$—COO]⁻, dotriacontanoate [CH$_3$—(CH$_2$)$_{30}$—COO]⁻, palmitoleate [CH$_3$—(CH$_2$)$_5$—CH=CH—(CH$_2$)$_7$—COO]⁻, oleate [CH$_3$(CH$_2$)$_7$CH=CH(CH$_2$)$_7$COO]⁻, linoleate [CH$_3$—(CH$_2$)$_4$—(CH=CHCH$_2$)$_2$—(CH$_2$)$_6$—COO]⁻, linolenate [CH$_3$—CH$_2$—(CH=CHCH$_2$)$_3$—(CH$_2$)$_6$—COO]⁻ and arachidonate [CH$_3$—(CH$_2$)$_4$—(CH=CHCH$_2$)$_4$—(CH$_2$)$_2$—COO]⁻,
the anions: 7,7-dimethyloctanoate [(CH$_3$)$_3$C—(CH$_2$)$_5$—COO]⁻, 2,2-dimethyloctanoate [CH$_3$—(CH$_2$)$_5$—C(CH$_3$)$_2$—COO]⁻, 2,2,3,5-tetramethylhexanoate [(CH$_3$)$_2$CH—CH$_2$—CH(CH$_3$)—C(CH$_3$)$_2$—COO]⁻, 2,5-dimethyl-2-ethylhexanoate [(CH$_3$)$_2$CH—(CH$_2$)$_2$—C(CH$_3$)(C$_2$H$_5$)—COO]⁻, 2,2-diethylhexanoate [CH$_3$—(CH$_2$)$_3$—C(C$_2$H$_5$)$_2$—COO]⁻, 2,4-dimethyl-2-isopropylpentanoate [(CH$_3$)$_2$CH—CH$_2$—C(CH$_3$)(i-propyl)-COO]⁻, and
C$_{10}$ to C$_{20}$ naphthenate anions.

7. The process as claimed in claim 1, wherein the carboxylate ligands are selected from the group consisting of carboxylates of empirical formula [C$_{10}$H$_{19}$O$_2$]⁻ and C$_{10}$ to C$_{20}$ naphthenates.

8. The process as claimed in claim 1, wherein the catalyst is a [Mg(neodecanoate)$_2$] complex or a [Mg(naphthenate)$_2$] complex with the naphthenate anion having a C$_{10}$ to C$_{20}$.

9. The process as claimed in claim 1, in which the organosilicon compound is a polyorganosiloxane comprising:
(i) at least two siloxyl units of formula (3) below:

(3)

in which:
the symbols which may be identical or different, represent C$_1$ to C$_{30}$ monovalent hydrocarbon-based radicals,
the symbols Z, which may be identical or different, each represent a hydrolyzable and condensable group or a hydroxyl group and are selected from the group consisting of hydroxyl, alkoxy, alkoxy-alkylene-oxy, amino, amido, acylamino, aminoxy, iminoxy, ketimonoxy, acyloxy, iminoxi, ketiminoxy and enoxy,
a is equal to 0, 1 or 2, b is equal to 1, 2 or 3, the sum a+b is equal to 1, 2 or 3, and optionally
(ii) one or more siloxyl units of formula (4) below:

(4)

in which:
the symbols R, which may be identical or different, represent C$_1$ to C$_{30}$ monovalent hydrocarbon-based radicals optionally substituted with one or more halogen atoms or with groups from among: amino, ether, ester, epoxy, mercapto or cyano, and
the symbol c is equal to 0, 1, 2 or 3.

10. The process as claimed in claim 1, in which the crosslinking agent is a silicon compound in which each molecule comprises at least three hydrolyzable and condensable groups and said crosslinking agent having formula (5) below:

(5)

in which:
the symbol R' is a monovalent hydrocarbon-based radical comprising from 1 to 30 carbon atoms,
the symbol Y is an alkoxy, alkoxy-alkylene-oxy, amino, amido, acylamino, aminoxy, iminoxy, ketiminoxy, acyloxy or enoxy group, and
the symbol a=3 or 4.

11. The process as claimed in claim 1, wherein the crosslinkable liquid silicone composition does not contain any catalyst having in a structure thereof, at least one tin atom.

12. The process as claimed in claim 1, wherein, in b), said silicone composition is deposited onto a flexible support which is a textile by transfer, by dip roll or by spraying using a nozzle, a doctor blade, a rotating frame or a reverse roll.

13. The process as claimed in claim 1, wherein the flexible support is a textile and optionally a lace or an elastic band.

14. A flexible support coated on one or two faces continuously or discontinuously with a solid silicone elastomer that may be obtained via the process as defined according to claim 1.

15. A composite material comprising:
a flexible support which may optionally be covered on one or two faces with one or more layers of a polymer material, and
a coat on said flexible support or on said polymer material, formed by a solid silicone elastomer obtained according to the process as defined according to claim 1.

16. A transparent or translucent solid silicone elastomer obtained with a catalyst comprising a magnesium complex comprising in a structure thereof, two identical or different carboxylate ligands, wherein each carboxylate ligand comprises from 10 to 32 carbon atoms.

17. A liquid silicone composition that is crosslinked via a condensation reaction as defined according to claim 1.

18. A solid silicone elastomer obtained by crosslinking in the presence of humidity provided by ambient air of a composition as described according to claim 17.

19. A one-pack RTV-1 composition which is in a single airtight pack and comprising a composition comprising a) a liquid silicone composition that is crosslinkable via condensation reactions is prepared, comprising:
  at least one organosilicon compound comprising at least two identical or different hydrolyzable and condensable groups, or at least two silanol functions ≡SiOH,
  at least one crosslinking agent,
  optionally at least one filler, and
  a catalytically effective amount of at least one catalyst which is a magnesium complex comprising in a structure thereof, two identical or different carboxylate ligands, wherein each carboxylate ligand comprises from 10 to 32 carbon atoms.

20. A two-pack RTV-2 composition, which is a precursor of composition comprising
a) a liquid silicone composition that is crosslinkable via condensation reactions is prepared, comprising:
  at least one organosilicon compound comprising at least two identical or different hydrolyzable and condensable groups, or at least two silanol functions ≡SiOH,
  at least one crosslinking agent,
  optionally at least one filler, and
  a catalytically effective amount of at least one catalyst which is a magnesium complex comprising in a structure thereof, two identical or different carboxylate ligands, wherein each carboxylate ligand comprises from 10 to 32 carbon atoms said two-pack RTV-2 composition being in two distinct packs P1 and P2, wherein:
a) pack P1 is airtight and comprises:
  a catalytically effective amount of at least one catalyst (M) which is a magnesium complex comprising in its structure two identical or different carboxylate ligands, wherein each carboxylate ligand comprises from 10 to 32 carbon atoms, and
  at least one crosslinking agent (B), and
b) pack P2 does not contain either said catalyst (M) or said crosslinking agent (B) and comprises:
  per 100 parts by weight of at least one organosilicon compound (A) comprising at least two identical or different hydrolyzable and condensable groups, or at least two silanol functions ≡SiOH, and
  from 0 to 10 parts by weight of water.

* * * * *